May 17, 1932.  L. PRANTL  1,858,902
FLOWER BOX
Filed Dec. 3, 1930
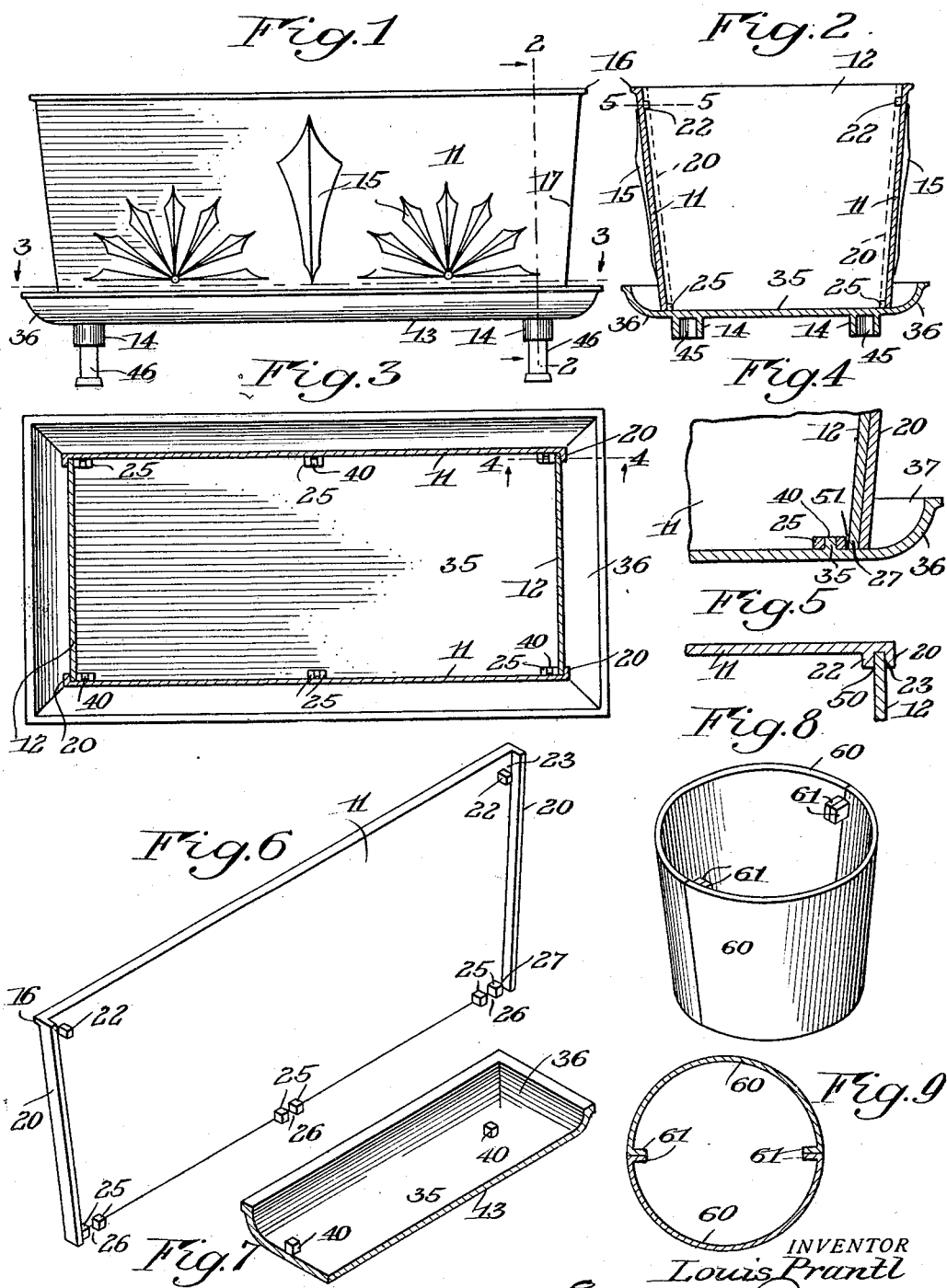
INVENTOR
Louis Prantl
BY Edward H. Cumpston
his ATTORNEY Patented May 17, 1932

1,858,902

UNITED STATES PATENT OFFICE

LOUIS PRANTL, OF ROCHESTER, NEW YORK

FLOWER BOX

Application filed December 3, 1930. Serial No. 499,748.

This invention relates to flower boxes and more particularly to those made of metal. The usual type of flower boxes are made of clay, sheet metal, or wood. The first of these materials is very fragile and easily broken; the second, being necessarily made of thin material, soon bulges, warps, and bends; the third, while it overcomes the difficulties present in the other two materials, soon rots and loosens at the joints. Flower boxes are sometimes made of concrete, which material although it is durable is very heavy and expensive, and has the disadvantage of often spalling and cracking.

I overcome these objectionable features, while at the same time effecting certain economies of manufacture, as well as producing a box which is capable of ornamentation both as to the outline and surface, by making the box of plates of cast metal, preferably iron, which are suitably secured at various points to provide strength and rigidity. Such a box is strong, durable, light, cheap, and may readily be made ornamental.

One of the objects of the present invention is the provision of a flower box of this kind which is strong and durable, with a construction capable of being ornamented to produce a pleasing appearance.

Another object of the invention is the provision of a flower box of this class which is simple, practical and inexpensive to manufacture.

A further object of the invention is to provide such a flower box which is readily assembled at a minimum of labor cost.

To these and other ends the invention resides in certain improvements and combinations of parts, all as will be hereinafter more fully described, the novel features being pointed out in the claims at the end of the specification.

In the drawings:

Fig. 1 is a front elevation of a flower box showing one embodiment of my invention;

Fig. 2 is a vertical sectional view taken substantially on the line 2—2 of Fig. 1;

Fig. 3 is a horizontal sectional view taken substantially on the line 3—3 of Fig. 1 showing the method of securing the bottom member to the frame;

Fig. 4 is a vertical sectional view taken substantially on the line 4—4 of Fig. 3 showing in detail the means for concomitantly securing the lower end of the end plate and the bottom member to the side member;

Fig. 5 is a horizontal sectional view taken substantially on the line 5—5 of Fig. 2 showing the means for securing the upper part of the end member in place;

Fig. 6 is a vertical perspective view of one of the side members showing the arrangement of the engaging members or lugs for securing the end and bottom members in position;

Fig. 7 is a perspective view of a portion of the bottom member showing the arrangement of the means for securing the bottom member to the side member;

Fig. 8 is a perspective view of another modification of my invention, and

Fig. 9 is a horizontal sectional view taken substantially through the lugs shown in Fig. 8.

The present invention is embodied, in the present instance by way of illustration, in a flower box comprising a frame having separate side, end, and bottom members all of cast metal, preferably cast iron although other metals may obviously be used. The side members are provided with marginal flanges and spaced lugs for securing the upper part of the end members in position. Adjacent the bottom edge of the side members are additional lugs some of which cooperate with the marginal portions to secure the bottom of the end members in position These lower lugs also engage cooperating projections on the bottom member and thus hold this member in position. The various parts are rigidly secured in poistion by electric welding or other suitable means, welding, however, being preferred in the present instance.

Referring to the drawings, Fig. 1, shows a flower box comprising sides 11, ends 12, a bottom member 13, and suitable supporting legs 14 preferably in the form of depending bosses integral with the bottom member 13. All parts are made of thin cast iron plates.

The side members 11 are in the form of cast metal plates, preferably iron about 1/8" in thickness and of any desired dimensions. The use of cast metal plates affords an opportunity for embodying various ornamental features, such as the design 15, Fig. 1. Obviously many other suitable designs may be used and will be readily suggested to those familiar with the art. Further ornamentation may be provided, if desired, in the form of a ridge 16 extending along the upper edge of the side member. The artistic appearance may be enhanced by enameling the outer surface of these plates in any color or combination of colors suitable to the individual fancy. While it is contemplated that the side edges of these members may be straight, it is preferred to have them tapered as shown at 17, Fig. 1. The side members themselves are inclined as shown in Figs. 2. The combination of the design 15, the ridge 16, and the tapered edges 17, as well as enameling, if desired, lends an artistic appearance to the box.

The side members 11 are also provided with means for retaining the end members in position, which means preferably comprises inwardly extending marginal portions 20 cast integral with the side members 11. These portions extend the full height of the side members, as clearly shown in Fig. 6, and provide a means for holding the end members against outward movement caused by the weight of the material within the box.

In order to assist the marginal portions to retain the end members in position, the side members 11 are further provided with additional securing means in the form of lugs or holding means 22 which extend inwardly from the inner surfaces of the side members adjacent the top thereof. These lugs are preferably cast integral with the side members, and spaced from the marginal portion 20 so as to provide a space 23 for the reception of the upper part of the end member, as clearly shown in Fig. 5 and hereinafter more fully described. These lugs cooperate with the marginal portions to retain the upper part of the end members in position. While these lugs may be made to project inwardly for any desired distance, a projection of 1/8 of an inch has been found to be sufficient.

The sides 11 are also provided with pairs of spaced lugs or engaging members 25 adjacent the lower edge thereof. The lugs comprising each pair are spaced so as to provide an opening 26 therebetween for the reception of a portion of the bottom member as hereinafter described. The pairs of lugs adjacent the ends of the side members 11 are spaced from the marginal portions 20 to provide openings 27 for the reception of the lower part of the end members 12, clearly shown in Fig. 4. Some of the pairs of lugs 25 thus cooperate with the lugs 22 and the marginal portions 20 for retaining the end members in position.

The above mentioned end members 12 are preferably in the form of cast iron plates similar to the sides 11, and have the edges thereof taper to conform with the slope of the sides 11, as clearly shown in Fig. 2. The outer surface of these plates may be plain, ornamented, or enameled as desired, the ornamentation being cast thereon and integral therewith in the manner stated with regard to the sides 11. The height and thickness of the ends 12 are the same as the sides 11, the length however, varying to suit the particular type of box to be made.

The frame formed by the sides 11 and the ends 12 is closed by a suitable bottom member 13, preferably in the form of a cast iron plate of the same thickness as the sides 11 and the ends 12. This bottom member comprises a flat portion 35 within the area of the frame, and a saucer-like portion 36 extending beyond the frame. The saucer-like portion is made integral with the flat portion and is formed by curving the extending periphery of the bottom member upwardly, as clearly illustrated in Figs. 2 and 4. This saucer-like portion extends outwardly from the sides of the box and provides a receptacle or moisture retaining flange 37 suitable for holding the drainage from the plants disposed within the box. The outer surface of the saucer portion is shown as being plain, but it may be suitably ornamented, if desired, as stated above in connection with the members 11 and 12. The flat portion 35 is provided with a plurality of spaced lugs or projections 40 extending upwardly from the inner surface thereof. These lugs are so disposed as to project into the openings 26 of the pairs of lugs 25 when the bottom member is in assembled position.

It is contemplated that the various lugs may be made separate and suitably secured to the various members; but it has been found decidedly advantageous to cast them integral with the various members thus greatly reducing, not only the cost of material, but also the cost of assembling.

The flower box is provided with a plurality of short legs or bosses 14 made integral with the bottom member 13 and depending therefrom. Each of these legs is provided with a centrally disposed opening or recess 45 for receiving a corresponding portion of a detachable leg 46. The openings 45 may be provided in any desired manner, but it is preferred to secure them by means of chills placed in the mold prior to casting the closure member. These chills are placed in the portion of the mold corresponding to the position of the openings 45, and thus enable a clean finished hole to be secured in the casting, subsequent drilling being thus eliminated. The detachable legs 46 may be provided with a portion which will fit snugly into the openings 45 and thus effectively secure the legs to the box, yet permitting the legs to be detached when desired. For convenience, or if desirable, the detachable legs may be removed and the box may then be supported on the short integral legs 14, as shown in Figs. 1 and 2.

In assembling the various parts, the sides 11 are placed on the bottom member 13 so that the lugs 40 thereof project into the spaces 26 between the pairs of lugs 25, as mentioned above, and as shown in Figs. 3 and 4. The end members are then slid downwardly along the marginal portions 20, behind the lugs 22 and the pairs of lugs 25 adjacent the ends of the side members, as clearly shown in Figs. 4 and 5. The box is now in the assembled position, and the various parts are now secured by electric welding in a manner to be presently described.

While these various parts may be rigidly secured by welding along the various seams, I secure the same effect, while at the same time greatly reducing the assembly cost, by welding only at certain definite points on the various members. The end members are welded at 50 and 51 respectively, thus securing these members to the lugs 22 and the pairs of lugs 25 adjacent the ends of the side members which lugs are integral with the sides 11. Thus by means of only four welds, I am able to rigidly secure each of the end members to the side members. As stated above, the lugs 40 of the bottom member extend into the spaces between the lugs 25 as shown at 55 in Fig. 4. By welding these lugs 40 to the lugs 25, the bottom member is secured to the sides, thus necessitating only six points of welding. This simplified means of assembly unites the parts in a unitary structure and requires only fourteen small welds which can be completed in less than one minute's time. As the various lugs are very small, being about ⅛ of an inch in length, only a drop of the welding material is needed in making each weld.

In order to provide means for draining the excess water from the plants which are disposed in the above mentioned box, the seam between the frame and the bottom member is left unsealed so as to provide a suitable discharge opening or drainage joint through which the drainage from the flowers within the box can flow to the receptacle 37.

Figs. 8 and 9 show a modified type of a flower box, in the form of a truncated cone having side members 60 each of which is provided with inwardly extending lugs 61 adjacent the top thereof and approximately on the diameter of the side members. The lugs 61 register when the sides 60 are brought into assembled relation as shown in Fig. 8, and are welded as described above so as to hold the upper part of the sides together. The lower edges of the member 60 are provided with lugs similar to the lugs 25 on the sides 11 for concomitantly securing the two side members and the bottom member (not shown). The bottom member used in the modified form is similar to that used in the preferred form, except that it is circular to conform to the shape of the side members 60.

In making the welds above referred to, the welding material which forms one side of the electrical circuit is touched to the spot to be welded and is left in this position for a period of two or three seconds, sufficient of the welding material being thus deposited at the desired point to securely weld the two pieces together. This method therefore enables the various welds to be made quickly, and with a minimum of labor cost and a minimum of welding material.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim as my invention:

1. A flower box comprising separate cast metal side members, a separate cast metal bottom member, lugs on said side and bottom members welded together for securing said parts together to form an integral structure and leaving a drainage joint between said side and bottom members, and means on said bottom member for retaining said drainage.

2. A flower box comprising separate side members of cast metal, a separate cast metal bottom member, lugs on said side and bottom members welded together for securing said parts together to form an integral structure and leaving a drainage joint between said side and bottom members, the outer faces of said side members having an ornamental design cast in relief thereon, and a moisture retaining flange associated with said bottom member.

3. A flower box comprising separate cast metal side and end members, inwardly extending marginal portions on said side members, holding means on said side members spaced from said marginal portions, said end members being disposed and held between said marginal portions and said holding means, lugs on said side members, a separate cast metal bottom member, and parts on said bottom member welded to said lugs for rigidly securing said bottom member to said side member.

4. A flower box comprising separate cast metal side and end members, said side members having inwardly extending marginal portions and holding means spaced from said marginal portions, engaging members on said side members spaced from said marginal portions and from said holding means, said end members being retained in position by said marginal portions, said holding means and said engaging members, a separate cast metal bottom member, and parts on said bottom member cooperating with said engaging members for securing said bottom member to said side members.

5. A flower box comprising separate cast metal side and end members, said side members having inwardly extending marginal portions and holding means spaced from said portions, pairs of lugs on said side members spaced from said holding means, certain of said lugs being adjacent to and spaced from said marginal portions, said end members being retained in position by said marginal portions, said holding means and said certain lugs, a separate cast metal bottom member, and projections on said bottom member extending between each pair of lugs for securing said bottom member to said side members.

6. A flower box comprising a frame having separate cast metal side and end members, said side members having marginal portions and holding means spaced from said portions, pairs of lugs on said side members spaced from said holding means, certain of said lugs being adjacent to and spaced from said marginal portions, said end members being retained in position by said marginal portions, said holding means and said certain lugs, a separate cast metal bottom member for said frame, said bottom member extending beyond said frame and having said extended portion formed to provide a moisture retaining flange, projections on said bottom member cooperating with said lugs for securing said bottom member to said side member and leaving a drainage joint between said side and end members, and said bottom member to permit drainage to flow into said retaining flange.

7. A flower box having separate cast metal side members, a cast metal bottom member, and lugs on said side and bottom members welded together, said side members having an ornamental design cast thereon, said bottom member having a plurality of bosses integral therewith and depending therefrom, each of said bosses having a recess therein suitable for receiving a cooperating portion of a detachable leg.

8. A method of making metal flower boxes comprising separately casting metal side members and a metal bottom member, certain of said side members being cast with an ornamental design and with inwardly extending lugs for cooperating with inwardly extending lugs cast on said bottom member, subsequently assembling said side and bottom members and electrically welding the lugs together for securing said parts to form an integral structure and leaving a drainage joint between said side and bottom members.

9. A method of making metal flower boxes comprising casting separate side and end members, casting a separate bottom member, said side members having integral lugs on the inner surfaces thereof, welding said end members to certain of said lugs, welding parts of said bottom member to others of said lugs for securing the parts together and leaving a drainage joint between said side and end members, and said bottom member, said bottom member being made of sufficient size to extend beyond the side and end members and having this extended portion formed to provide a receptacle for moisture which flows through said drainage joint.

10. A method of making metal flower boxes comprising casting separate plates to form side, end, and bottom plates, said side plates having lugs on the inner faces thereof, one or more of said side and end plates having ornamental designs cast on the outer faces thereof, said bottom plate having projections on the upper surface thereof cooperating with certain of the said lugs, and electrically welding said lugs for rigidly securing said end and bottom members to said side members.

11. A method of making metal flower boxes comprising separately casting metal side members and a metal bottom member, certain of said side members being cast with an ornamental design and with inwardly extending lugs for cooperating with inwardly extending lugs cast on said bottom member, said bottom member having a plurality of bosses depending therefrom, each of said bosses being provided with an opening for detachably receiving a supporting leg, subsequently assembling said side and bottom members, electrically welding the lugs together for securing said parts to form an integral structure and leaving a drainage joint between said side and bottom members, and securing said detachable legs in said openings formed in said bosses.

LOUIS PRANTL.